US006976015B2

(12) United States Patent
Kumar et al.

(10) Patent No.: US 6,976,015 B2
(45) Date of Patent: Dec. 13, 2005

(54) METHOD FOR EXTRACTING DATA FROM A RELATIONAL DATABASE USING A REDUCED QUERY

(75) Inventors: Arun Kumar, Fremont, CA (US); Eric Smadja, Kirkland (CA)

(73) Assignee: Hyperion Solutions Corporation, Santa Clara, CA (US)

(*) Notice: Subject to any disclaimer, the term of this patent is extended or adjusted under 35 U.S.C. 154(b) by 394 days.

(21) Appl. No.: 10/007,619

(22) Filed: Nov. 7, 2001

(65) Prior Publication Data

US 2003/0088548 A1    May 8, 2003

(51) Int. Cl.[7] .............................................. G06F 17/30
(52) U.S. Cl. ................... 707/3; 707/2; 707/4
(58) Field of Search ..................... 707/3, 2, 4

(56) References Cited

U.S. PATENT DOCUMENTS

| | | | |
|---|---|---|---|
| 5,519,859 A | 5/1996 | Grace | 395/600 |
| 6,052,681 A * | 4/2000 | Harvey | 707/3 |
| 6,189,004 B1 * | 2/2001 | Rassen et al. | 707/3 |
| 6,532,470 B1 * | 3/2003 | Cochrane et al. | 707/102 |
| 6,609,123 B1 * | 8/2003 | Cazemier et al. | 707/4 |

OTHER PUBLICATIONS

A. Netz, M. Bower, P. Turner, Newsgroup thread: *comp.databases.ola*, Subject: "Essbase SQL Interface," Jun. 19, 2000.
"Hyperion® Essbase® Data Mart Design Approaches," Hyperion Solutions Corporation, Nov. 2000.

* cited by examiner

*Primary Examiner*—Mohammad Ali
*Assistant Examiner*—CamLinh Nguyen
(74) *Attorney, Agent, or Firm*—Lipsitz & McAllister, LLC

(57) ABSTRACT

A database manager and a corresponding method for having a database manager extract information from a relational database having, e.g., a star configuration (i.e. having a hub table and related so-called dimension tables) in response to what is called a joining query (one that would require that dimension tables be joined to the hub table), and, in addition, a query according to the invention. The method includes the steps of: having the database manager provide an alias table for a field from at least one dimension table that would be joined to the hub table according to the joining query, the alias table including each value of the field occurring in the dimension table (the aliased field) and also including an alias for each value of the aliased field; and having the database manager transform the joining query into a reduced query in which the aliased field is replaced by the alias.

9 Claims, 5 Drawing Sheets

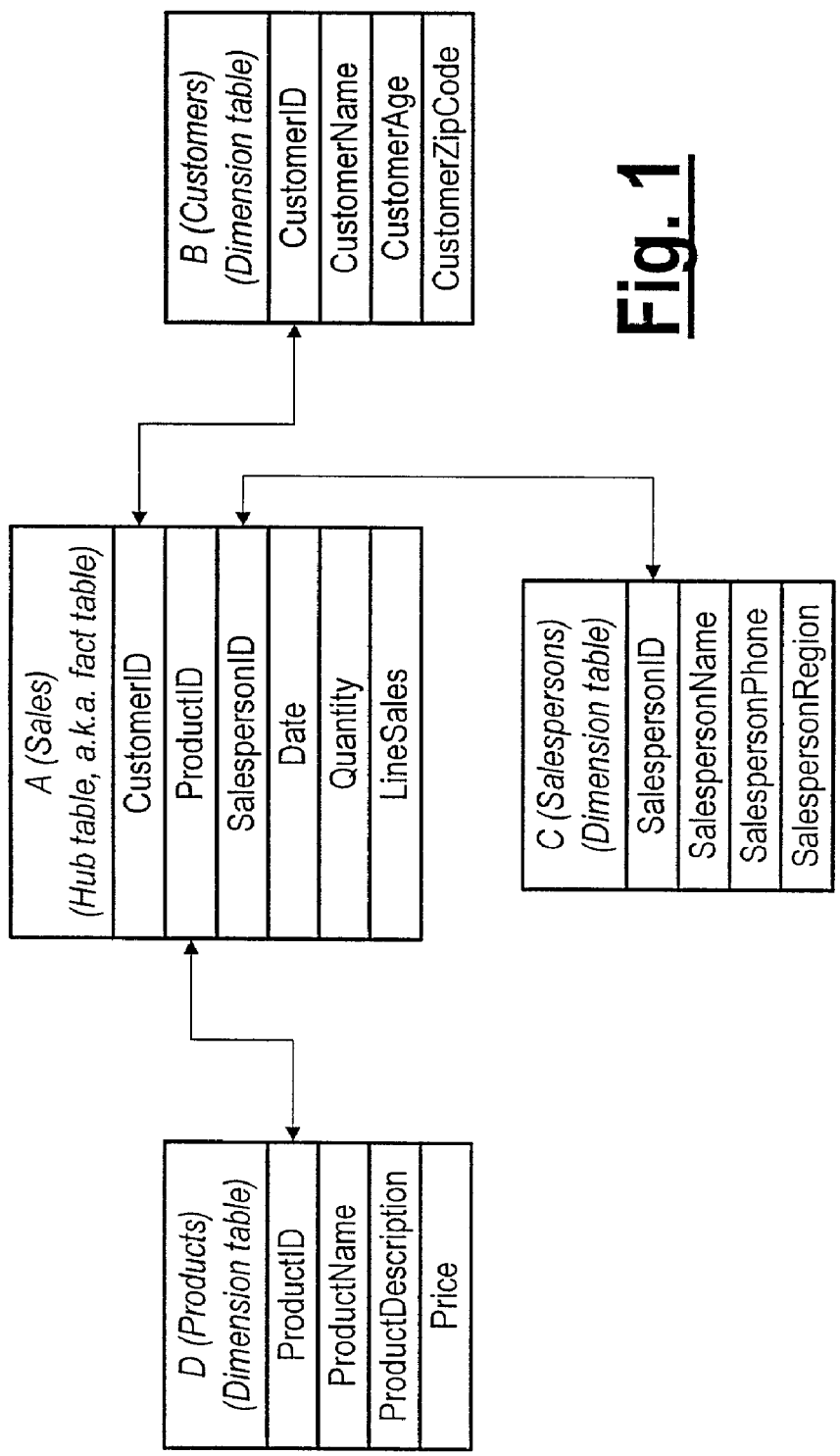

METHOD FOR EXTRACTING DATA FROM A RELATIONAL DATABASE USING A REDUCED QUERY

FIELD OF THE INVENTION

The present invention relates to extracting data from a database, and more particularly to using a query (e.g., structured query language) to extract data from a relational database.

BACKGROUND OF THE INVENTION

Relational databases, in which various tables of data are inter-related through fields that occur in the different related tables, are well known in the art. The use of structured query language (SQL) by which to instruct a database manager to extract data from a relational database is also known in the art. See for example U.S. Pat. No. 5,519,859 to Grace for a Method and Apparatus for Automatic Table Selection and Generation of Structured Query Language Instructions.

The structure of the tables and fields in a database is often diagrammed in a tree structure. A tree is a special form of directed graph, which generally commences at a distinguished vertex called the root. The root has no predecessors. Every vertex other than the root has a unique predecessor. Vertices (or nodes) of a tree that have successors are called non-terminal vertices, or parent nodes. Vertices that have no successors are called terminal vertices, or leaves. All nodes that have a parent (i.e., all nodes except the root node) are referred to as child nodes. The tree terminology set forth above (i.e., root, node, leaf, etc.) is often used in describing the structure of a relational database.

The ease of use and general applicability of relational databases have resulted in their being used extensively, in many different environments. Business, especially, has found relational databases appropriate for its needs, including in situations where even a very large amount of data is stored and maintained. With a large amount of data, because of how queries of a relational database are performed according to the prior art, the processing needed to respond to some queries can take a large amount of time. A typical query refers to several tables of a relational database. The time required to process a query is typically not linearly related to the number of fields in the relational database, but instead is roughly related to the product of the number of fields in each table referred to in a query.

Many relational databases have what is called a star configuration in which one table, called the hub table, is related to each of the other tables of the relational database; the other tables are each referred to as dimension tables. For example, referring to FIG. 1, a relational database is shown including tables A (Sales), B (Customers), C (Salespersons), and D (Products). The B, C and D tables are all related to the A (Sales) table by each having a field that corresponds to a field in the sales table, which is therefore the hub table, and the B, C, and D tables are therefore each a dimension table. For example, table C (the Salespersons table) is related to the hub table (the sales table) through the field having the fieldname SalesPersonID.

Another relational database management structure (RDBMS) is known as a snowflake configuration. As will be appreciated by those skilled in the art, snowflake is an alternative wide configuration for a RDBMS structure of tables.

To create a report showing the total sales for each product, for each customer, and for each salesperson requires, according to the prior art, that the database manager responding to the query perform a search of the database in which each row of the Sales table is examined, and for each row of the Sales table, each of the dimension tables is also examined. To provide a report in which the salesperson is not included would require looking at fewer rows of tables of the database; the reduction would be roughly by a factor equal to the number of rows of the Salespersons table, for each row of the Sales table. In providing the report, for each row of the Sales table, the database manager refers to the Customers table to find the customer name based on the customer ID, and then to the Products table to find the product name given the product ID, and then to the Salespersons table to find the sales person name given the salesperson ID. The report layout is indicated in FIG. 2. In preparing a report for such a database, the database manager must examine a total number of rows of tables roughly (order of magnitude) equal to the product of the number of rows in each table. (For each row of the hub table, for each field occurring in a dimension table, the database manager must perform a search of the dimension table to find the field value referred to, a search that typically involves looking at a substantial number of the rows of the dimension table.)

Although today's processing power is substantial, and increasing still, the volume of data in many relational databases is such that sometimes burdensome amounts of time must be allocated to preparing reports, the greater the number of dimension tables referred to in a query, the longer the processing time needed by the database manager responding to the query.

What is needed is a way to provide a report, in response to a query that includes fields from the hub table and at least some dimension tables of e.g., a star or snowflake relational database, that does not require that for each row of the hub table the database manager examine the dimension tables referred to, yet provides the same report as would be provided according to the prior art, and therefore doing so in substantially less processing time.

SUMMARY OF THE INVENTION

Accordingly, the present invention provides a database manager and a corresponding method for having a database manager extract information from a relational database in response to a joining query. The relational database includes a hub table and a plurality of dimension tables. Each table includes a plurality of records, each of which includes a plurality of fields. Each dimension table is related to the hub table by a key field, such that each dimension table includes in each record such a key field. The hub table also includes the key field. The joining query requires that at least one join be performed by the database manager in processing the joining query. In accordance with the method, the database manager examines the joining query to determine what fields from each dimension table are to be provided in response to the query. The database manager provides an alias table for at least one such field from at least one dimension table. The alias table includes each value of the field occurring in the dimension table and also includes an alias for each value of the field. The database manager transforms the joining query into a reduced query in which any field for which an alias has been created is replaced by the alias.

In an illustrated embodiment, an alias table is created for a field from a dimension table only if no other field from the dimension table is selected by the joining query.

In a further aspect of the invention, the method also includes the step of providing a final response to the query, wherein in providing the final response, a response primitive is first provided including the alias. The final response is derived from the response primitive by replacing in the response primitive the alias values with the aliased field values using the alias table.

A computer readable medium comprising instructions for performing the above methods is also provided.

From another perspective, the invention is a query for use by a database manager in extracting information from a relational database. The relational database includes a hub table and a plurality of dimension tables. Each table includes a plurality of records, each of which includes a plurality of fields. Each dimension table is related to the hub table by a key field. The query comprises a select clause in which at least one field to be selected from one of the dimension tables is indicated by an alias, the alias indicating a location in a memory device where the actual field value to be selected is stored.

A corresponding database manager is also disclosed.

Also disclosed is a method for constructing a query statement for extracting data from a relational database. Aliases are provided instead of actual values for leaf nodes of the relational database. All the aliases for the leaf node are selected from a fact table instead of an individual dimension table. In this manner, the requirement for joins in the query statement is reduced or eliminated.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram of one type of relational database to which the present invention applies, i.e., a star relational database in which at least some tables, called dimension tables, are all related to a hub table, also called a fact table;

FIG. 2 is representation of the layout of a report of data extracted from the database illustrated in FIG. 1;

DETAILED DESCRIPTION OF THE INVENTION

The invention is described below for a pure star relational database, i.e. one in which there is a hub table and other tables, all of which are related to the hub table through a field, often called a key field. The hub table includes the more dynamic data, and so is the primary table used in responding to a query. As such, the hub table is also often called a fact table (since it is the table that includes the actual data sought by the query, but instead of repeating for each record the complete information for, e.g., a customer, sales person or product, it simply refers to the other tables for that information). The other tables are known as dimension tables.

Figure 6:
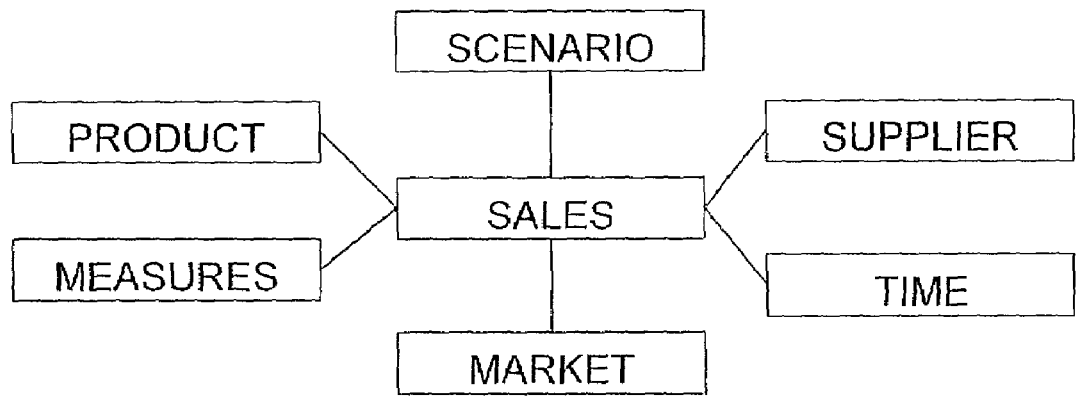
FIG. 6 is a diagram of a star schema for a relational database table structure.
Figure 7:
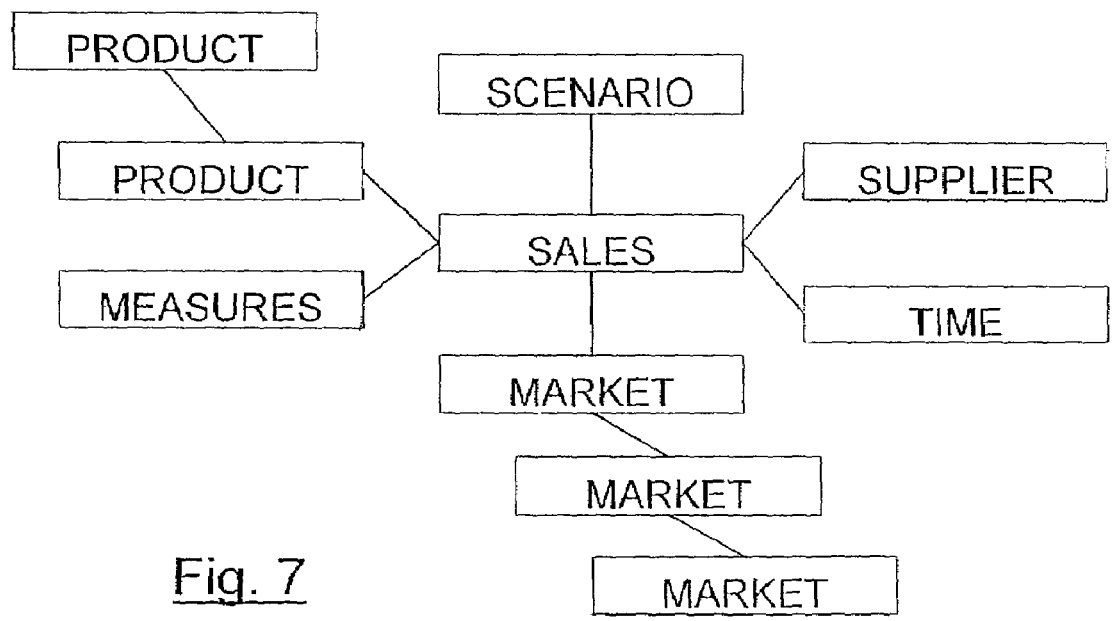
FIG. 7 is a diagram of a snowflake schema for a relational database table structure.

An example star structure is illustrated in FIG. 6, where all the dimension tables (i.e., scenario, product, measures, market, time and supplier) are directly connected to the fact table (i.e., sales). It should be understood however, that the invention applies also to relational databases in which only some (dimension) fields are related to a fact table (which would then be a sort of quasi-hub table). An example alternative structure that can be implemented in accordance with the invention is the snowflake structure of FIG. 7. In the snowflake example, some of the dimension tables (i.e., product and market) are connected to other dimension tables and not directly to the fact table.

Referring again to FIG. 1, a relational database is shown as including a hub table indicated as table A (Sales), and three dimensional tables indicated as tables B (Customers), C (Salespersons), and D (Products). Each of the dimension tables is related to the hub table through a field, called a key field. For example, the key field having the field name SalespersonID relates the Salespersons table (table C) to the Sales table (table A).

Referring again to FIG. 2, the layout of a report that might be prepared from the relational database shown in FIG. 1 is indicated as having for each row a salesperson name, a customer name, a product name, and the total sales for the indicated product, for the indicated customer, and sold by the indicated sales person. To prepare the report, the database manager processing the report adds up all of the linesales for the same customer, salesperson and product, i.e. it groups together all of the records in the Sales table having the same customer, salesperson and product, and for each group adds up the linesales for each of the records in the group.

Whereas in preparing the report indicated by FIG. 2, a database manager according to the prior art would refer to each of the dimension tables for each row of the Sales table (the hub table or fact table), the invention provides the same report without having to do so. The invention avoids having to refer to a dimension table for each row of the Sales table each time a field in a dimension table is indicated in the report. This is achievable because in accordance with the invention, alias tables are created based on the required report. For each field from a dimension table included in the report, the database manager (i.e. for example a preprocessor module of the database management system) creates an alias table having the key field relating the dimension table to the hub table, and the field included in the report. Then, as explained below (in connection with FIG. 4), the database manager prepares the report referring only to the hub table (i.e. the fact table), using the key fields for each dimension table as aliases for the fields to be included in the report. The report is then provided as output after replacing the aliases with the aliased fields, using the alias tables to make the replacements.

A report is typically specified using well-known structured query language (SQL) statements. For example, the report indicated by FIG. 2 could be produced according to the prior art using the SQL statement:

select B.CustomerName, C.SalespersonName, D.ProductName, sum(A.LineSales);
  from B, C, D, A;
  where
  B.CustomerID=A.CustomerID,
  C.SalespersonID=A.SalespersonID, and
  D.ProductID=A.ProductID;
  group by B.Customer, C.SalespersonName, D.ProductName.

The above SQL statement is here referred to as a joining query because processing of the query requires that each of the dimension tables be joined (in the relational database sense) with the hub table with the consequence that, roughly speaking, to process the query, for each row of the hub table, each row of each dimension table must be examined. Thus, if in the present example, the hub table includes $10^3$ rows, and each of the dimension tables includes $10^2$ rows, the database manager must examine (roughly) $10^9$ rows of data.

Figure 3:
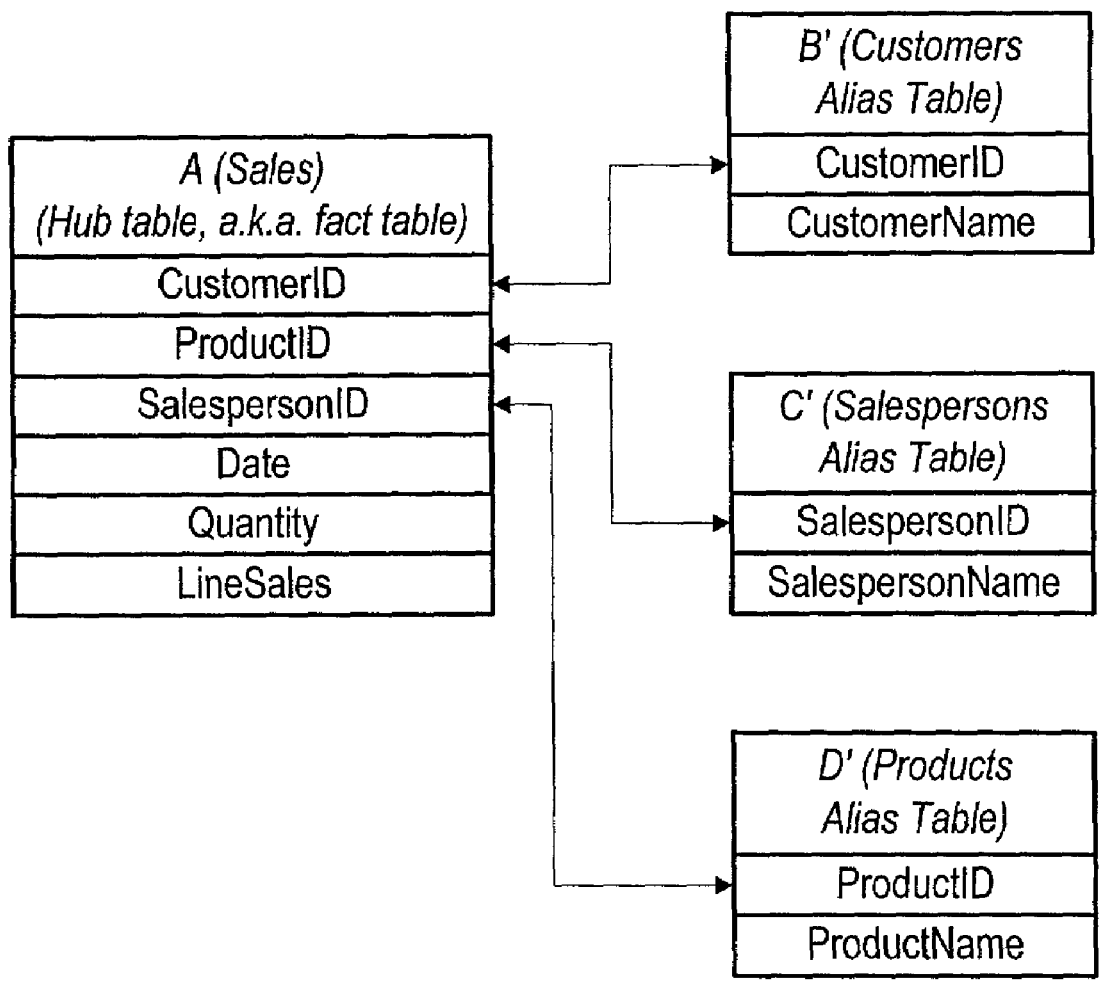
FIG. 3 is a block diagram illustrating the hub table from which the basic information used in providing a report according to a query is provided, and alias tables are used according to the invention to complete the report.

Referring now to FIG. 3, as explained above, according to the invention to avoid having to join to the hub table each of the dimension tables referred to in a joining SQL statement, alias tables B' (Customers), C' (Salespersons) and D' (Products) are created. An alias table for a dimension table contains an alias (the key field value in the hub table used to index into the dimension table) for each value of the field of the dimension table referred to in the joining SQL statement. In the example given, the joining SQL statement refers to, for example, CustomerName and uses CustomerID to index into the customer (dimension) table. (The joining SQL statement could just as well have asked for CustomerzipCode or CustomerAge, but the alias would again be the CustomerID.) Preferably, the invention is used in case of no more than one field per dimension table being referred to in the joining SQL statement. If more than one field is referred to in the joining SQL statement, a subindex into a more-than-two field alias table must be created to allow distinguishing between the two fields corresponding to the key field relating the dimension table to the hub table. Alternatively, in case of a joining SQL statement selecting more than one field from some dimension tables, but selecting only one field from other dimension tables, the invention is used only in connection with the dimension tables from which only one field is selected in the joining SQL statement; in such a partial application of the invention, only some of the joins required by the joining SQL statement are eliminated.

In the preferred embodiment, the invention converts the original, joining SQL statement to what is here called a reduced SQL statement, replacing the field names of fields in the dimension tables (the aliased fields) with their aliases. In the example given above, the reduced SQL statement is as follows:

Select A.CustomerID, A.SalespersonID, A.ProductID, sum(A.LineSales);
  from A.Sales
  group by A.CustomerID, A.SalespersonID, A.ProductID.

Since only the hub field is referenced in this (reduced) SQL statement, no joins are required.

Internally, i.e. before providing the actual response, the relational database manager selects aliases from the hub table instead of actual field values from the individual dimension tables. When providing the query as an output, the relational database manager replaces the aliases with the values of the aliased fields by referring to the alias tables.

The result therefore is the same for a reduced SQL as for a joining SQL, but the reduction in processing is substantial because the reduced SQL does not require that the relational database manager perform any joins.

The alias tables are preferably created by the relational database manager dynamically, i.e. in response to a query. Alternatively, especially in the case of routine queries, alias tables can be created in anticipation of a (routine) query, and kept synchronized with the actual dimension tables by updating the alias tables when changes are made to the dimension tables.

Figure 4:
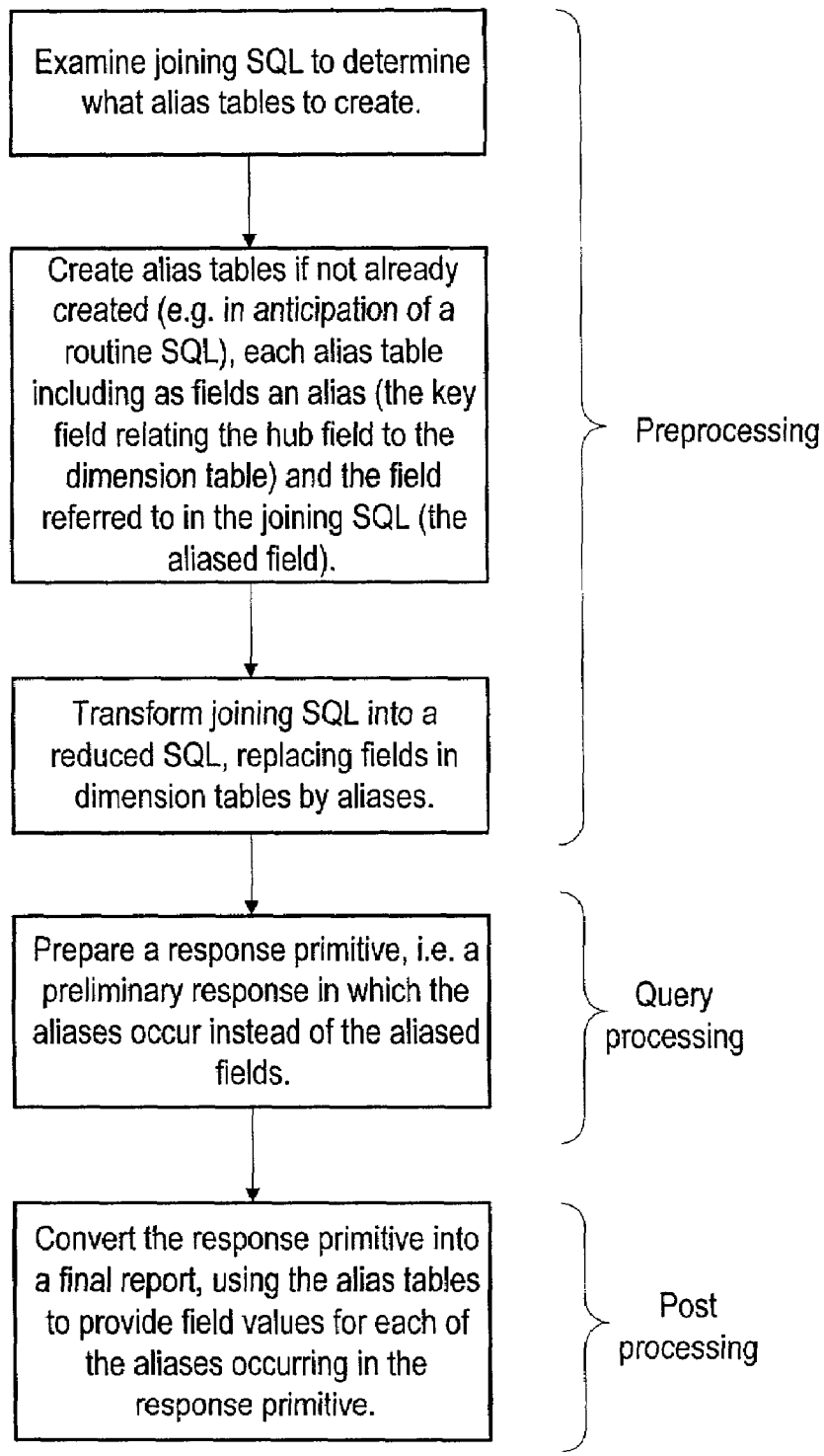
FIG. 4 is a flow chart of a method according to the invention.

Referring now to FIG. 4, a flow chart of a method of processing a query, according to the invention, is shown as beginning with the first step in which a joining query (typically a SQL statement making reference to a hub table and also to one or more dimension tables) is examined by a relational database manager (especially adapted to practice the invention) so as to determine what alias tables to create. As explained above, an alias table is preferably created for each field occurring in the joining query that is from a dimension table and is the only field from the dimension table occurring in the query. (If more than one field from a dimension table occurs in the joining query, then either no alias table is created for the dimension table, i.e. for any of the fields of the dimension table, or a subindex into a multiple-alias table including more than one aliased field is provided.) In the next step, the relational database manager creates the alias tables, assuming they have not been created in anticipation of the query (as for example might be done in case of a routine query). In a next step, the joining query is transformed into a reduced query, i.e. a SQL statement that includes aliases instead of actual field names and so does not require that the relational database manager perform any joins. Then, the database manager prepares what is here called a response primitive, i.e. a preliminary response (preliminary to the final response, a query output or report) in which the aliases occur instead of the aliased fields. Finally, the database manager converts the primitive response into a final response (a query output or report), using the alias tables to provide field values for each of the aliases occurring in the primitive response.

Figure 5:
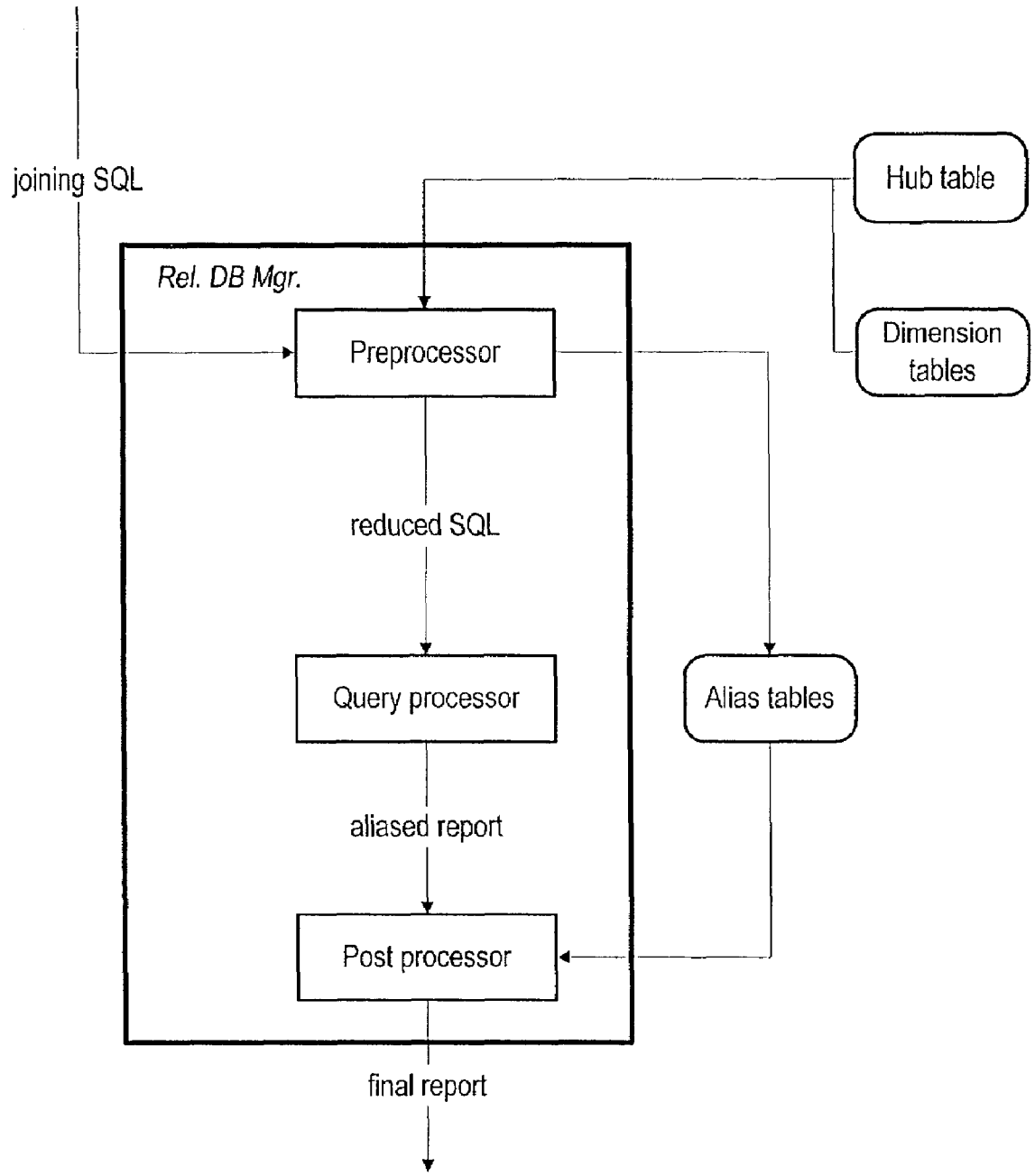
FIG. 5 is a block diagram of a relational database manager according to the invention which includes a preprocessor module for performing the steps indicated as preprocessing steps in FIG. 4.

Referring now to FIG. 5, a relational database manager (Rel. DB-Mgr.) operative according to the invention is shown as including first a preprocessor module for performing the steps indicated as preprocessing steps in FIG. 4, i.e. the steps of examining the joining SQL to determine what alias tables are needed to eliminate the need for joins in responding to the joining SQL, the creating of the alias tables, and the transforming of the joining SQL into a reduced SQL. Next, it contains a query processing module (which may be according to the prior art), using the reduced SQL as its input, and providing a response primitive (aliased report) as its output. Lastly, it includes a postprocessor module that converts the response primitive to a final response using the alias tables.

It should now be appreciated that the present invention provides methods and apparatus for extracting data from a relational database using structured query language, in which optimized SQL statements are generated. Instead of using prior art type SQL statements, which are slow and require substantial computer resources (due to the extremely large number of tables that are joined together), alias tables are created in accordance with the present invention. The use of such alias tables reduces (or eliminates) the number of joins required, thereby substantially reducing the processing and time requirements for generating a report. The changes to the SQL statements provided in accordance with the invention include providing aliases instead of actual values for leaf nodes of the relational database, and selecting all the aliases for the leaf node from the fact table, instead of the individual dimension table (thereby eliminating joins).

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for use by a database manager in extracting information from a relational database in response to a joining query, the relational database including a hub table and a plurality of dimension tables, each dimension table including a plurality of records each of which includes a plurality of fields, wherein each dimension table is related to the hub table by a key field such that each dimension table includes in each record such a key field and the hub table also includes the key field, the joining query selecting at least one field from at least one dimension table, the method comprising the steps of:
   a) examining the joining query and providing an aliasing list indicating at least one field from at least one dimension table indicated in the joining query and also indicating the identity of the at least one dimension table, the aliasing list thereby providing a list of to-be-aliased fields and corresponding dimension table identities;
   b) providing an alias table for the at least one field in the aliasing list, the alias table including each value of the field occurring in the at least one dimension table and also including an alias value for each value of the field, and using as the alias value the value of the key field relating the dimension table to the hub table, the alias table thereby providing a table of alias field values and corresponding aliased field values;
   c) transforming the joining query into a reduced query, wherein the aliased field values are replaced by the alias values, and a join is eliminated; and
   d) providing a final response to the query, wherein in providing the final response, a response primitive is first provided including the alias value, and the final response is derived from the response primitive by replacing in the response primitive the alias values with the aliased field values using the alias table.

2. The method of claim 1, wherein an alias table is created for a field from a dimension table only if no other field from the dimension table is selected by the joining query.

3. A computer readable medium comprising instructions for performing the method claimed in claim 1.

4. A reduced query for use by a database manager in extracting information from a relational database,
   the relational database including a hub table and a plurality of dimension tables,
   each dimension table including a plurality of records each of which includes a plurality of fields,
   each dimension table related to the hub table by a key field,
   an alias table comprising an alias table alias field and an aliased value field,
   the reduced query comprising a select clause in which a field is selected from one of the dimension tables using a hub table alias,
   the hub table alias indicating, by way of the alias table alias field, the value of the selected field in the dimension table, and
   the database manager being adapted to replace the hub table alias with an aliased value from the aliased value field by way of an alias table alias from the alias table alias field, thereby avoiding at least one join in the reduced query.

5. The query of claim 4, wherein the alias is the key field relating the dimension table to the hub table.

6. A database manager for extracting information from a relational database in response to a joining query, the relational database including a hub table and a plurality of dimension tables, each dimension table including a plurality of records each of which includes a plurality of fields, wherein each dimension table is related to the hub table by a key field such that each dimension table includes in each record such a key field and the hub table also includes the key field, the joining query selecting at least one field from at least one dimension table, the database manager comprising:
   a) means for examining the joining query and providing an aliasing list indicating at least one field from at least one dimension table indicated in the joining query and also indicating the identity of the at least one dimension table, the aliasing list thereby providing a list of to-be-aliased fields and corresponding dimension table identities;
   b) means for providing an alias table for the at least one field in the aliasing list, the alias table including each value of the field occurring in the at least one dimension table and also including an alias value for each value of the field, and using as the alias value the value of the key field relating the dimension table to the hub table, the alias table thereby providing a table of alias field values and corresponding aliased field values;
   c) means for transforming the joining query into a reduced query, wherein: the aliased field values are replaced by the alias values, and a join is eliminated; and
   d) means for providing a final response to the query, wherein in providing the final response, a response primitive is first provided including the alias, and the final response is derived from the response primitive by replacing in the response primitive the alias values with the aliased field values using the alias table.

7. The database manager of claim 6, wherein an alias table is created for a field from a dimension table only if no other field from the dimension table is selected by the joining query.

8. A method for constructing a query statement for extracting data from a relational database in conjunction with a database manager, comprising:
   providing aliases instead of actual values for leaf nodes of the relational database, and
   selecting all the aliases for the leaf node from a fact table instead of an individual dimension table, thereby reducing the requirement for joins in said query statement;
   wherein the database manager is adapted to:
   transform the query statement into a reduce query by replacing the aliases with the actual values of the leaf nodes and avoid additional joins, and
   provide a final response to the query, wherein in providing the final response primitive is first provided including the aliases, and the final response is derived from the response primitive by replacing aliases in the response primitive with aliased filed values using an alias table.

9. A method in accordance with claim 8, wherein joins are eliminated from said query statement.

* * * * *